United States Patent
Ishiguro et al.

(10) Patent No.: US 7,194,265 B2
(45) Date of Patent: Mar. 20, 2007

(54) METHOD AND SYSTEM FOR DETERMINING ANTENNA OF RADIO BASE STATION AT MOVING TARGET AREA DURING HANDOVER

(75) Inventors: Takayuki Ishiguro, Yokosuka (JP); Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 593 days.

(21) Appl. No.: 10/449,195

(22) Filed: Jun. 2, 2003

(65) Prior Publication Data

US 2003/0224829 A1   Dec. 4, 2003

(30) Foreign Application Priority Data

Jun. 4, 2002   (JP)   .............................. 2002-163483

(51) Int. Cl.
*H04Q 7/20*   (2006.01)
(52) U.S. Cl. .................... 455/436; 455/67.13; 370/334
(58) Field of Classification Search ................ 455/436, 455/562.1, 67.13, 438; 370/334
See application file for complete search history.

(56) References Cited

U.S. PATENT DOCUMENTS 4,475,010 A * 10/1984 Huensch et al. ............ 370/334
5,669,060 A    9/1997 Guimont

FOREIGN PATENT DOCUMENTS

WO    WO 99/33304    7/1999

* cited by examiner

*Primary Examiner*—Matthew D. Anderson
*Assistant Examiner*—Sanh Phu
(74) *Attorney, Agent, or Firm*—Oblon, Spivak, McClelland, Maier & Neustadt, P.C.

(57) ABSTRACT

At a time of the handover, the communications with respect to the radio terminal related to the handover are carried out by using the same antenna as the antenna with respect to the other radio terminal that is already located in the moving target area, so that interferences due to the difference in the propagation paths can be suppressed to the minimum, and the receiving quality can be improved.

4 Claims, 5 Drawing Sheets

FIG. 5

| RADIO COMMUNICATION SYSTEM | IMT-2000 CDMA-TDD |
|---|---|
| RADIO COMMUNICATION CALL | 64K DATA COMMUNICATION CHANNEL |
| RECEIVING METHOD | JOINT DETECTION |
| TRANSMISSION POWER CONTROL OF RADIO TERMINAL 10 | ABSENT |
| TRANSMISSION POWER CONTROL OF RADIO TERMINAL 11 | PRESENT |
| ANTENNA SELECTION OF RADIO TERMINAL 10 | FIXED ANTENNA (CONVENTIONAL METHOD), METHOD OF PRESENT INVENTION |
| ANTENNA SELECTION OF RADIO TERMINAL 11 | ANTENNA WITH LARGER RECEIVING POWER FOR UPLINK SIGNALS |
| NUMBER OF RADIO BASE STATION ANTENNAS | TWO |
| NUMBER OF RADIO TERMINAL ANTENNAS | ONE |
| CONVENTIONAL METHOD OF RADIO TERMINAL 10 | FIXING ANTENNA |
| PROPAGATION PATH MODEL | DYNAMIC CHARACTERISTIC |

METHOD AND SYSTEM FOR DETERMINING ANTENNA OF RADIO BASE STATION AT MOVING TARGET AREA DURING HANDOVER

BACKGROUND OF THE INVENTION

1. Field of the Invention

The present invention relates to method and system for determining antenna at a radio base station at a time of handover in the radio communication such as that of the CDMA scheme that is carried out between a mobile radio terminal and the radio base station.

2. Description of the Related Art

In general, in the communication system in which the radio communication such as that of the CDMA scheme is carried out between a mobile radio terminal and a radio base station, at a time of the handover in which the mobile radio terminal moves from a currently located area to another area, a switching to an antenna of a radio base station that controls a moving target area is carried out and then a synchronization with the radio base station of the moving target area is established.

Conventionally, in this antenna switching related to the handover, when the radio base station of the moving target area has a plurality of antennas, an antenna for transmitting signals to the mobile radio terminal under the handover has been determined fixedly until the synchronization is established.

However, when the antenna for transmitting signals is fixed, there can be cases where a plurality of radio signals to be code division multiplexed are transmitted by an antenna different from that used by the mobile radio terminal that is already located in the moving target area.

When the mobile radio terminal receives such signals that are transmitted from an antenna different from the antenna already in use, there has been a problem that the influence of interferences becomes large and the receiving quality is degraded because the propagation paths are different for different signals. In particular, in the case of despreading the code division multiplexed signals by the RAKE or the like, there has been a possibility of the influence by a phase displacement due to interferences.

As a method for preventing such interferences that can be caused at a time of the handover, there has been a method in which the phase and the transmission power at a time of the transmission are determined such that the signal power received by the mobile radio terminal of the other user becomes small, by using the adaptive array antenna technique.

However, when this adaptive array antenna technique is used, there have been problems that many antennas become necessary in order to suppress interferences sufficiently small, and a control processing and a driving device configuration become complicated.

BRIEF SUMMARY OF THE INVENTION

It is therefore an object of the present invention to provide method and system for determining antenna of a radio base station which is capable of reducing interferences at a time of the handover, without complicating a control processing and a driving device configuration.

According to one aspect of the present invention there is provided a radio base station device for carrying out radio communications with a radio terminal, the radio base station device comprising: a handover detection unit configured to detect a handover when the radio terminal moves between areas covered by different radio base stations; an antenna in use detection unit configured to detect one antenna currently in use among a plurality of antennas controlled by the radio base station device at a moving target area, in relation to the handover detected by the handover detection unit; and an antenna determining unit configured to determine the one antenna detected by the antenna in use detection unit as an antenna to be used with respect to the radio terminal related to the handover at the moving target area.

According to another aspect of the present invention there is provided a method for determining an antenna in radio communications between a radio base station and a radio terminal, the method comprising: (a) detecting a handover when the radio terminal moves between areas covered by different radio base stations; (b) detecting one antenna currently in use among a plurality of antennas controlled by the radio base station at a moving target area, in relation to the handover detected by the step (a); and (c) determining the one antenna detected by the step (b) as an antenna to be used with respect to the radio terminal related to the handover at the moving target area.

Other features and advantages of the present invention will become apparent from the following description taken in conjunction with the accompanying drawings.

BRIEF DESCRIPTION OF THE DRAWINGS

FIG. 5 is a table summarizing conditions under which the simulation result shown in FIG. 4 is obtained.

DETAILED DESCRIPTION OF THE INVENTION

Referring now to FIG. 1 to FIG. 5, one embodiment of antenna determining method and system according to the present invention will be described in detail.

(Basic Configuration of an Antenna Determining System)

Figure 1:
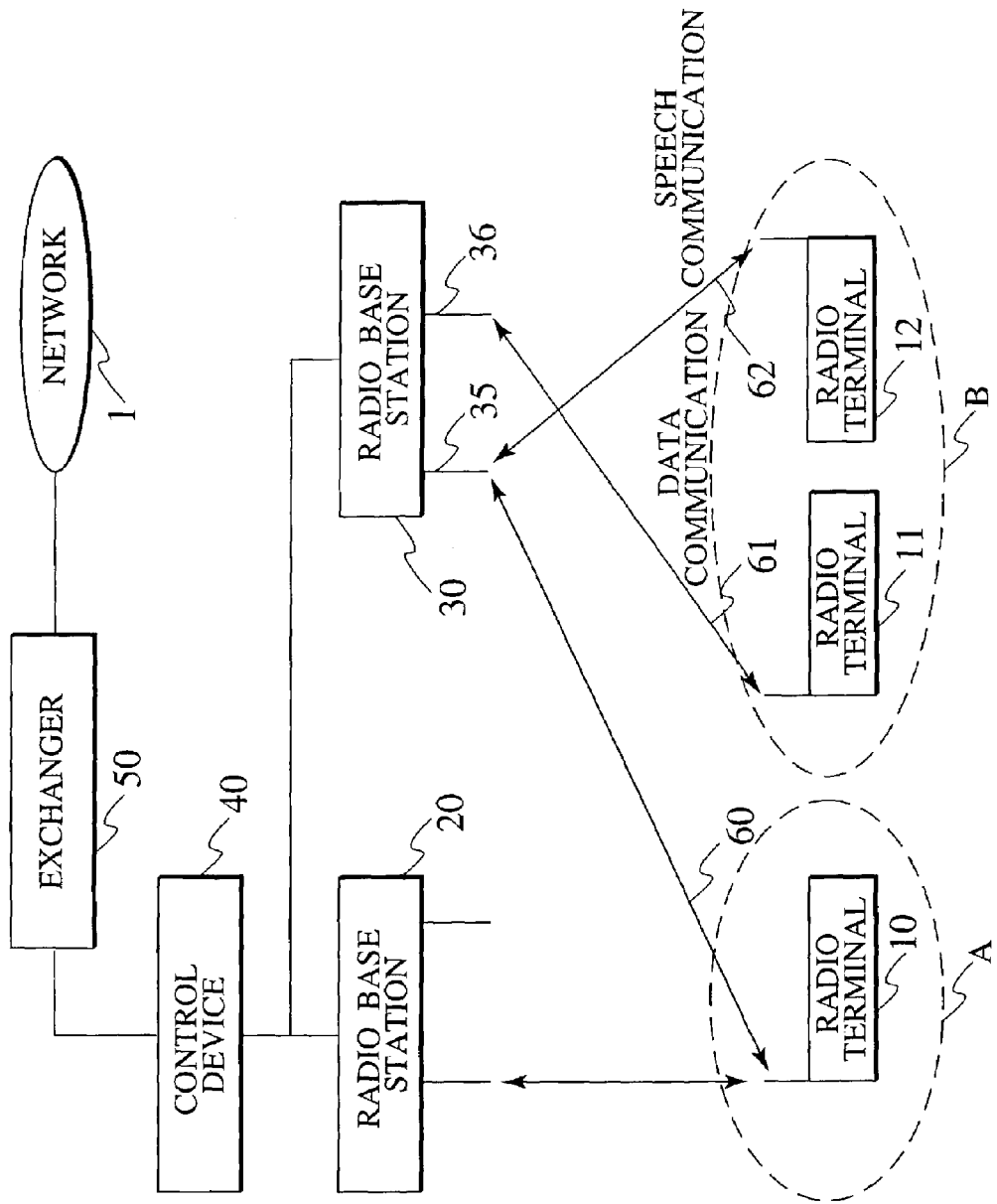
FIG. 1 is a diagram showing a schematic overall configuration of an antenna determining system according to one embodiment of the present invention.

FIG. 1 shows an overall configuration of an antenna determining system according to this embodiment.

As shown in FIG. 1, the antenna determining system comprises radio terminals 10 to 12, radio base stations 20 and 30 for carrying out radio communications in the CDMA scheme with these radio terminals 10 to 12, a control device 40 for carrying out control of handovers by the radio terminals 10 and 11 and the radio base stations 20 and 30, an exchanger 50 connected to the control device 40, and a network 1 connected to the exchanger 50.

The radio terminals 10 to 12 are mobile portable terminals having a communication function such as portable telephones, PDAs, etc.

The control device 40 is connected with the radio base stations 20 and 30, and manages radio terminals that are located in an area controlled by each radio base station, detects a handover when a radio terminal moves between areas, and notifies the occurrence of the handover to the radio base station related to the handover.

The exchanger 50 is a device for connecting the radio terminals that are establishing communications through the radio base stations 20 and 30, to the network 1. The network 1 is a communication network formed by interconnecting wired and radio public networks and dedicated lines, which include LAN, Internet, etc.

The radio base stations 20 and 30 control respective areas and carry out communications with radio terminals located in respective areas, and are connected to the network through the control device 40 and the exchanger 50. In this embodiment, the radio base station 20 controls the area A, the radio base station 30 controls the area B, and currently the radio terminal 10 is located in the area A and the radio terminals 11 and 12 are located in the area B. Here, it is assumed that the radio terminal 10 is moving from the area A to the area B, and the handover for the radio terminal 10 occurs.

Figure 2:
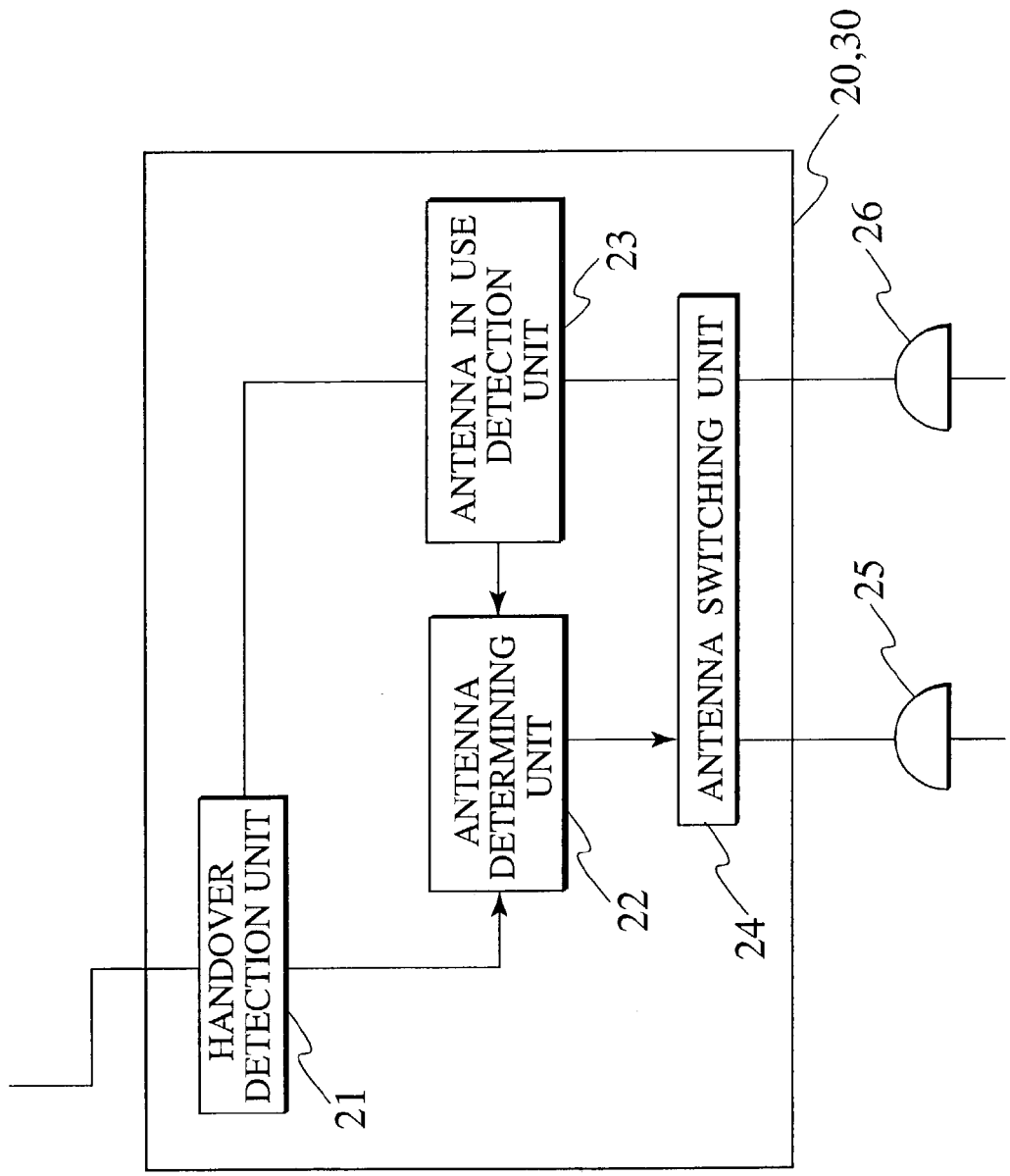
FIG. 2 is a block diagram showing a configuration of a radio base station according to one embodiment of the present invention.

Also, in this embodiment, each one of the radio base stations 20 and 30 has at least two transmission antennas, and each antenna is capable of transmitting and receiving signals with respect to many radio terminals. More specifically, as shown in FIG. 2, each one of these radio base stations 20 and 30 has a handover detection unit 21, an antenna determining unit 22, an antenna in use detection unit 23, an antenna switching unit 24, and a plurality of antennas 25 and 26.

The handover detection unit 21 is a device for detecting the handover when the radio terminal moves between areas, and in this embodiment, the handover detection unit 21 detects the handover by receiving a notification from the control device 40. Note that, in this embodiment, the handover detection unit 21 is connected to the antenna determining unit 22 and the antenna in use detection unit 23, and sends a control signal for commanding the antenna switching to the antenna determining unit 22 and the antenna in use detection unit 23 when the handover is detected.

The antenna determining unit 22 is a device for determining the antenna detected by the antenna in use detection unit 23 as an antenna with respect to the radio terminal that is related to the handover in the moving target area, which determines the antenna to be used with respect to the radio terminal that has come into the area controlled by the own radio base station and transmits the determination result to the antenna switching unit 24.

Note that, in this embodiment, when the antenna in use detection unit 23 detects a plurality of antennas, the antenna determining unit 22 determines an antenna which is transmitting and receiving a radio channel of the highest priority call among the communications established by these plurality of antennas as an antenna with respect to the radio terminal that is related to the handover.

The antenna in use detection unit 23 is a device for detecting the antenna that is currently in use among the antenna controlled by the own radio base station, and in this embodiment, the antenna in use detection unit 23 detects the antenna in use by scanning the state of use of each antenna according to the control signal from the handover detection unit 21, and notifies the result to the antenna determining unit 22.

The antenna switching unit 24 is a device for switching the antenna to be used with respect to the radio terminal, according to the determination made by the antenna determining unit 22.

(The Antenna Determining Method Using the Antenna Determining System)

Figure 3:
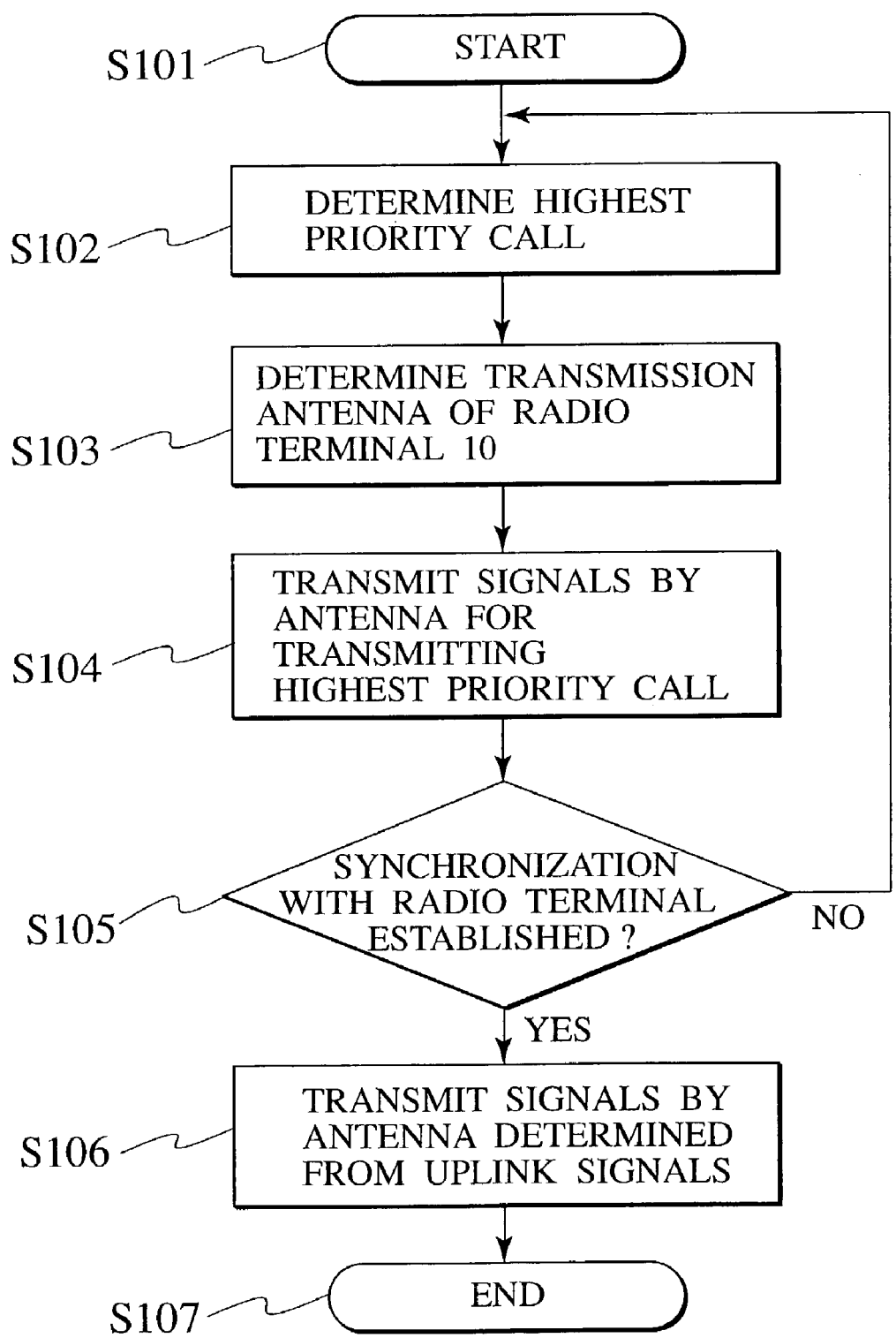
FIG. 3 is a flow chart showing a procedure of an antenna determining method according to one embodiment of the present invention.

Next, the antenna determining method using the antenna determining system of this embodiment having the above described configuration will be described. FIG. 3 shows a procedure of the antenna determining method according to this embodiment.

Now, the radio terminal 10 is located in the area A controlled by the radio base station 20, and the radio terminals 11 and 12 are located in the area B controlled by the radio base station 30. The radio base station 30 is currently in communications with the radio terminals 11 and 12, and carrying out the data communications through a radio channel 61 by using an antenna 36 with respect to the radio terminal 11, while carrying out the speech communications through a radio channel 62 by using an antenna 35 with respect to the radio terminal 12. The method for determining these antennas can be an open loop transmission diversity, for example. In the open loop transmission diversity, the signals from the radio terminal 11 are received at two transmission antennas, and an antenna with the larger received signal power from the radio terminal 11 at an immediately previous instance is chosen as an antenna for transmission.

Then, when the handover occurs as the radio terminal 10 moves from the area A to the area B, the control device 40 detects this handover, and notifies the radio base station 30 that is controlling the moving target area B, so as to starts the antenna determining method (step S101).

In response to this notification from the control device 40, the radio base station 30 allocates a radio channel 60 with respect to the radio terminal 10 related to the handover, while scanning the antennas currently in use by the antenna in use detection unit 23 and transmitting the scanning result to the antenna determining unit 22. Here, it is assumed that the antennas 35 and 36 are detected.

According to the scanning result from the antenna in use detection unit 23, the antenna to be used with respect to the radio terminal 10 is determined. More specifically, the antenna determining unit 22 searches through the other radio channels which are to be code division multiplexed with the radio channel 60 by which the radio communications are to be carried out by the radio terminal 10 which starts the radio communications with the radio base station 30 as a result of the handover, and determines a radio channel of the highest priority call among these searched radio channels (step S102).

In this embodiment, this highest priority call is determined according to errors in the signals required for each communication. For example, it is possible to carry out the re-transmission of data even when an error occurs in the signals for the data communications, so that the speech communication becomes the highest priority call over the data communication. Here, the radio terminal 12 is carrying out the speech communications, so that the radio channel 62 with respect to the radio terminal 12 becomes the highest priority call.

Then, the antenna 35 that is transmitting the signals of the highest priority call is determined as the antenna for transmitting signals to the radio terminal 10 (step S103), and the transmission with respect to the radio terminal 10 is started by using this antenna 35 (step S104).

Next, the radio base station 30 transmits a synchronization signal to the radio terminal 10 by using the radio channel 60 at the antenna 35. At this point, the synchronization signal is transmitted to the radio terminal 10 at the same phase as the phase of signals to be transmitted to the radio terminal 12. Upon receiving this synchronization signal, the radio terminal 10 transmits signals to the radio base station 30, and as a result the synchronization between the radio base station 30 so as to establish the radio terminal 10 (step S105). When this synchronization is established, the processing proceeds to the step S106, whereas otherwise the above described steps S102 to S104 are repeated by the loop processing.

At the step S106, the radio base station 30 determines the antenna according to the uplink signals transmitted from the radio terminal 10, and the transmission and reception of signals are carried out by using this determined antenna in the case where the synchronization is already established. This determination of the antenna after the synchronization is realized by the open loop transmission diversity, for example.

(Modified Embodiments)

Note that, in the above described embodiment, the determination by the antenna determining unit 22 is made according to the highest priority call of the radio terminals located in the area B, but the present invention is not necessarily limited to this case, and it is also possible to determine the antenna with respect to the radio terminal 10 related to the handover according to the required quality when the antenna in use detection unit 23 detected a plurality of antennas.

More specifically, in the case where the radio base station 30 is transmitting signals to the radio terminals 11 and 12 by using a plurality of antennas, the radio base station 30 controls the transmission power or the phase for each one of the plurality of antennas such that the receiving quality of the radio terminal 11 or 12 becomes good.

In the case where the radio base station 30 transmits signals to the radio terminal 10 before establishing the synchronization with the radio terminal 10, the antenna for transmitting signals to the radio terminal 10 is determined according to the transmission power by which signals are transmitted to the radio terminal 11, and signals are transmitted to the radio terminal 10 by using that antenna, at the same phase as signals transmitted to the radio terminal 12.

It is possible to determine an antenna with the larger transmission power by which signals can be transmitted to the radio terminal 12 as the transmission antenna with respect to the radio terminal 10, and it is also possible to determine an antenna with the smaller transmission power by which signals can be transmitted to the radio terminal 12 as the transmission antenna with respect to the radio terminal 10.

In addition, it is also possible to apply the antenna determining method and system according to this embodiment to the case where the open loop transmission diversity cannot be carried out, as in the case where the radio base station 30 and the radio terminal 10 are carrying out the ordinary radio communications through the radio channel 60 and the radio base station 30 failed to receive signals transmitted by the radio terminal 10, for example.

(Effects)

According to this embodiment of the present invention described above, the radio base station 30 sets the same antenna for transmissions with respect to the radio terminal 12 and the radio terminal 10 so as to make the propagation paths of signals to the radio terminal 12 and signals to the radio terminal 10 become the same, so that there is an advantage in that the effect of removing signals to the radio terminal 10 becomes larger when the radio terminal 12 received the signals.

Note that, until the synchronization is established between the radio base station 30 and the radio terminal 10, the radio base station 30 cannot select the transmission antenna in order to improve the receiving quality at the radio terminal 10, but the radio base station 30 can determine the antenna for transmitting signals to the radio terminal 10 according to the transmission antenna for the radio terminal 11.

Also, the antenna for transmitting signals to the radio terminal 12 can be determined by using the open loop transmission diversity such that the radio terminal 12 can receive signals at the best possible quality, and there is an advantage that the receiving characteristic of the radio terminal 12 will not be degraded.

Figure 4:
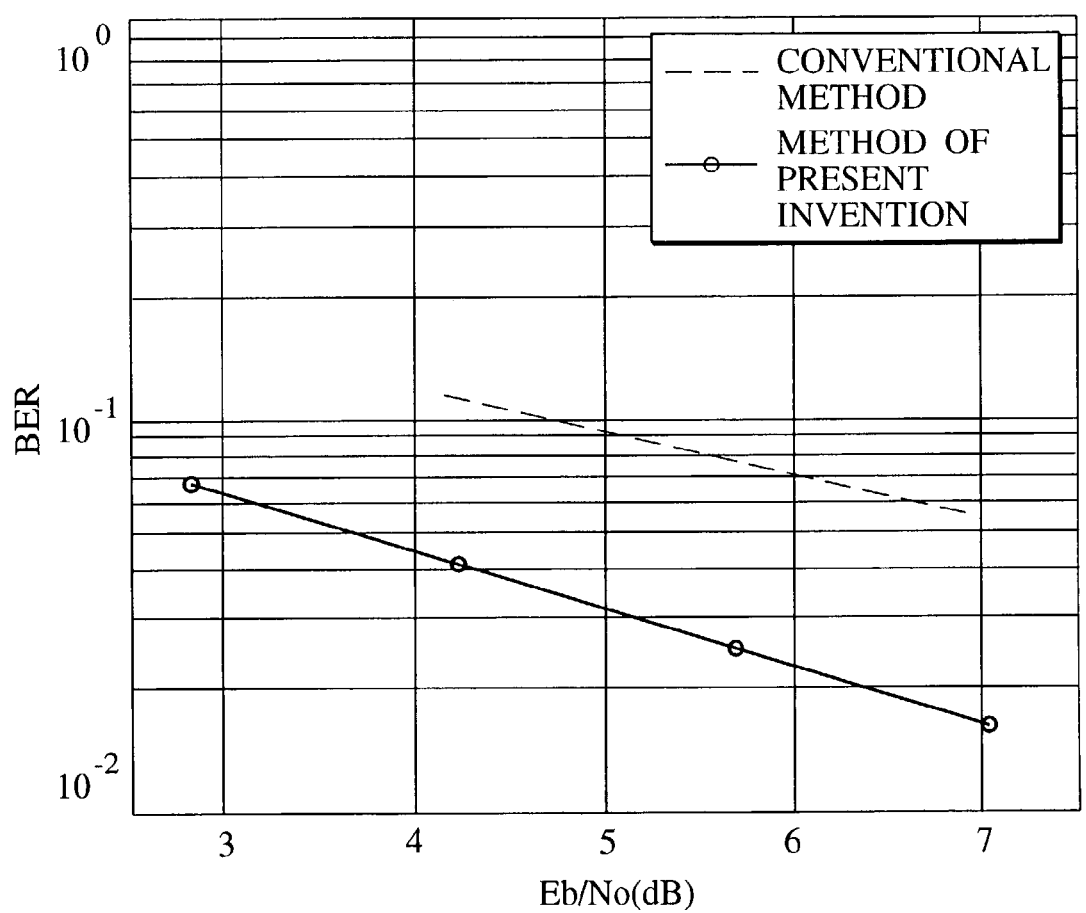
FIG. 4 is a graph showing a simulation result for comparing the conventional method and the method of one embodiment of the present invention.

There is also an advantage in that interferences with respect to the radio terminal 10 can be reduced, for the radio communication call for which the quality should be given a highest priority, by determining the highest priority call in the case involving many users whose signals are to be code division multiplexed. FIG. 4 shows a simulation result for comparing the conventional method and the method according to this embodiment, which is obtained under conditions summarized in FIG. 5.

As should be apparent from the simulation result of FIG. 4 and FIG. 5, according to this embodiment, the bit error rate (BER) with respect to the bit power to noise power ratio (Eb/No) is reduced compared with the conventional method.

As described above, the method and system for determining antenna and the radio base station according to the present invention, it is possible to reduce interferences at a time of the handover, without complicating the control processing and the driving device configuration.

According to the present invention, at a time of the handover, the communications with respect to the radio terminal related to the handover are carried out by using the same antenna as the antenna with respect to the other radio terminal that is already located in the moving target area, so that interferences due to the difference in the propagation paths can be suppressed to the minimum, and the receiving quality can be improved.

In addition, it is possible to give a higher priority to the antenna by which the communications that can be affected more severely by the communication quality degradation due to interferences are already established, such that the overall communication service can be improved.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio base station device for carrying out radio communications with a radio terminal, the radio case station device comprising:

a handover detection unit configured to detect a handover when the radio terminal moves between areas covered by different radio base stations;

an antenna in use detection unit configured to detect one antenna currently in use among a plurality of antennas controlled by the radio base station device at a moving target area, in relation to the handover detected by the handover detection unit; and an antenna determining unit configured to determine the one antenna detected by the antenna in use detection unit as an antenna to be used with respect to the radio terminal related to the handover at the moving target area, wherein when the antenna in use detection unit detects more than one antennas, the antenna determining unit determines one of these more than one antennas to be selected, based upon which one is used for a highest priority call, as the antenna to be used with respect to the radio terminal related to the handover.

2. A method for determining an antenna in radio communications between a radio base station and a radio terminal, the method comprising:
   (a) detecting a handover when the radio terminal moves between areas covered by different radio base stations;
   (b) detecting one antenna currently in use among a plurality of antennas controlled by the radio base station at a moving target area, in relation to the handover detected by the step (a); and
   (c) determining the one antenna detected by the step (b) as an antenna to be used with respect to the radio terminal related to the handover at the moving target area as the antenna based upon which one of the plurality of antennas is used for a highest priority call.

3. A radio base station device for carrying out radio communications with a radio terminal, the radio case station device comprising:
   a handover detection unit configured to detect a handover when the radio terminal moves between areas covered by different radio base stations;
   an antenna in use detection unit configured to detect one antenna currently in use among a plurality of antennas controlled by the radio base station device at a moving target area, in relation to the handover detected by the handover detection unit; and
   an antenna determining unit configured to determine the one antenna detected by the antenna in use detection unit as an antenna to be used with respect to the radio terminal related to the handover at the moving target area,
   wherein when the antenna in use detection unit detects more than one antennas, the antenna determining unit determines one of these more than one antennas which is used for a highest priority call as the antenna to be used with respect to the radio terminal related to the handover, wherein the highest priority call is the call permitting the fewest signal errors.

4. A method for determining an antenna in radio communications between a radio base station and a radio terminal, the method comprising:
   (a) detecting a handover when the radio terminal moves between areas covered by different radio base stations:
   (b) detecting one antenna currently in use among a plurality of antennas controlled by the radio base station at a moving target area, in relation to the handover detected by the step (a); and
   (c) determining the one antenna detected by the step (b) as an antenna to be used with respect to the radio terminal related to the handover at the moving target area as the antenna which is used for a highest priority call, wherein the highest priority call is the call permitting the fewest signal errors.

* * * * *